United States Patent [19]
Maruyama et al.

[11] 3,947,046
[45] Mar. 30, 1976

[54] OIL SEAL RING FOR INTERNAL COMBUSTION ENGINE

[75] Inventors: Masayuki Maruyama; Joichi Watanabe, both of Kashiwazaki, Japan

[73] Assignee: Riken Piston Ring Kogyo Kabushiki Kaisha, Tokyo, Japan

[22] Filed: May 30, 1973

[21] Appl. No.: 365,128

[52] U.S. Cl. ............ 277/235 A; 277/81 P; 277/236; 418/178
[51] Int. Cl.² ..................... F16J 15/00; F04C 15/00
[58] Field of Search .............. 277/235 A, 236, 81 P; 418/178

[56] References Cited
UNITED STATES PATENTS

| | | | |
|---|---|---|---|
| 2,404,616 | 7/1946 | Bramberry | 277/235 A |
| 3,658,451 | 4/1972 | Gomada | 277/236 |
| 3,787,152 | 1/1974 | Mitsuyama | 418/142 |
| 3,830,601 | 8/1974 | Yamazaki | 277/236 |

*Primary Examiner*—Samuel B. Rothberg
*Attorney, Agent, or Firm*—Oldham & Oldham Co.

[57] ABSTRACT

An oil seal ring is obtained which can maintain its oil scraping performance at a satisfactory level despite the frictional wear it undergoes. It is formed with a tapered sliding surface having a hardness maximized at its oil scraping edge and decreasing with the distance therefrom. It can be manufactured by casehardening a ring blank through one end surface thereof which is oppositely tapered and subsequently finishing the end surface to shape.

3 Claims, 5 Drawing Figures

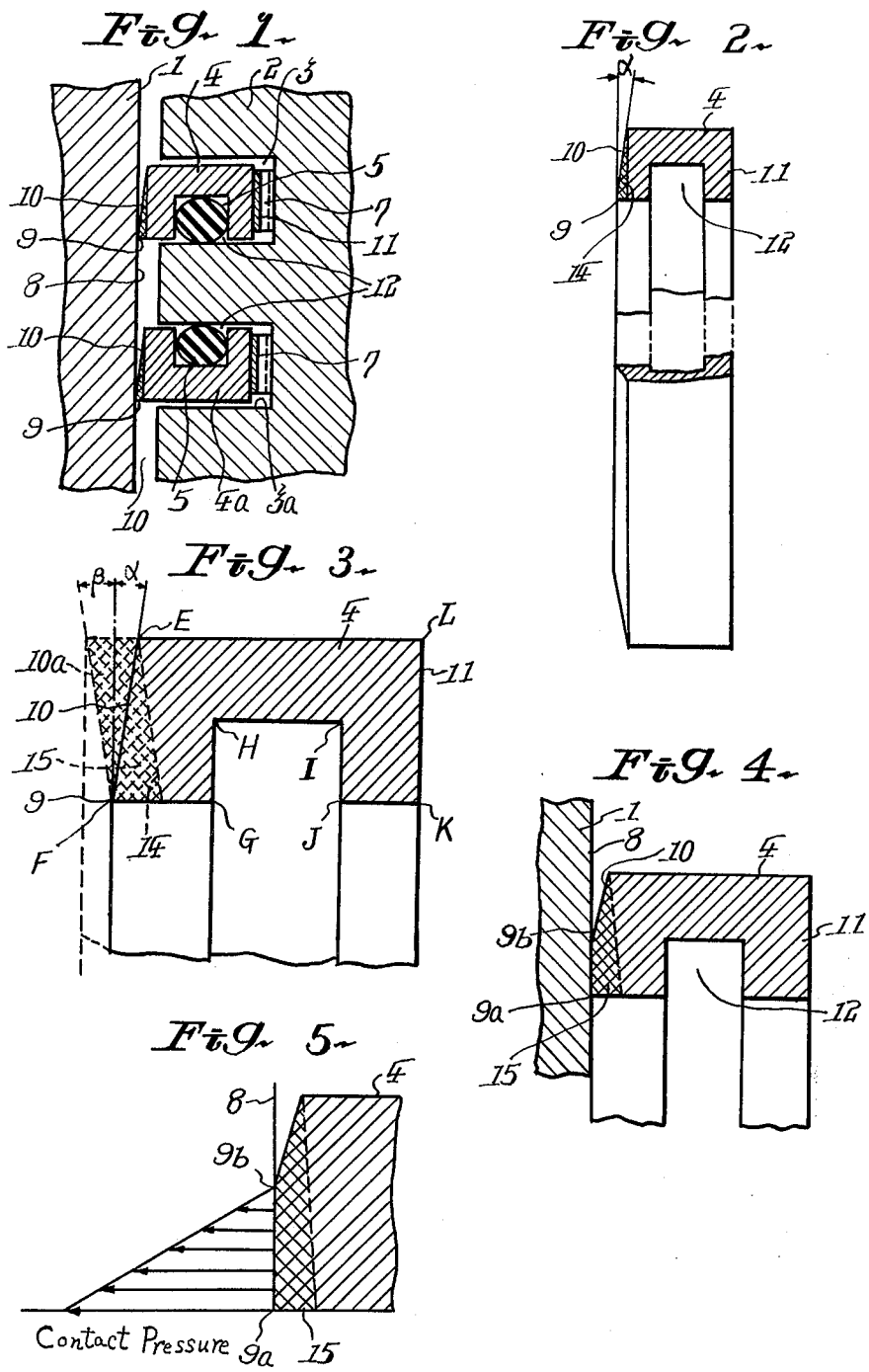

OIL SEAL RING FOR INTERNAL COMBUSTION ENGINE

BACKGROUND OF THE INVENTION

This invention relates generally to improvements in oil seal rings and more particularly to those for reciprocating and rotary piston internal combustion engines and to methods of making such rings.

As is well known, oil seal rings of the character described are principally intended to prevent intrusion of any excess of lubricating oil into the combustion chamber of the engine and in use are moved slidingly along the inside wall surface of the associated cylinder of a reciprocating piston combustion chamber or of the side housing of a rotary piston combustion engine, as the case may be, to scrape down any excess of lubricating oil lying on the surface. In order that such oil seal ring may maintain its oil scraping performance at a satisfactory level for any extended period of service, it is desirable that the oil scraping edge of the ring be held at all times acute enough to make line contact with the associated wall surface of the engine for efficient oil scraping. In fact, however, oil seal rings and particularly those used in a rotary piston engine are subjected to complex external forces and thus forced to make complicated movements. This causes a considerable frictional wear of the ring and which in the past has resulted in substantial loss in acuteness and hence in oil scraping effect of the ring edge held in sliding contact with the engine wall surface and thus has caused increase in lubricant oil consumption of the engine. Further, as wear of the ring proceeds, the area of the ring surface contacting with the engine wall surface increases and this has previously resulted in reduction in pressure of contact therebetween and hence in impairment of the oil scraping effect of the oil seal ring.

SUMMARY OF THE INVENTION

In view of the above, the present invention has for its object the provision of a new and improved oil seal ring which is free, despite the frictional wear inevitable in use, from any substantial reduction in oil scraping effect as caused by loss in acuteness of the oil scraping edge, and/or increase in area of contact thereof with the associated engine wall surface and resulting decrease pressure of contact therebetween.

Another object of the present invention is to provide a method of manufacturing such improved oil seal rings with efficiency.

In order to attain these and other objects, the present invention proposes to impart to the sliding surface of an oil seal ring such as appropriate gradient in hardness that the ring surface may at all times exhibit a hardness maximized at its oil scraping edge and decreasing with the radial distance therefrom.

An oil seal ring of the character described can be produced according to the method of the present invention by preparing a ring blank including an appropriate amount of material to be machine cut or ground off and having an end surface tapered or inclined, as indicated in FIG. 3 at 10a, in a direction opposite to that in which the sliding surface 10 finally obtainable on the ring blank is to be inclined, subjecting the tapered end surface of the ring blank to casehardening treatment for penetration or diffusion therein of such hardening element as nitrogen, carbon or chromium, thereby to form a hardened wear-resistant surface layer, and subsequently finishing the treated blank surface to the taper or inclination specified for the sliding surface 10 thereby to expose the underlying layers of material treated to varying degrees. The sealing or sliding surface thus obtained on the ring blank apparently exhibits a definite hardness gradient, and hence a wear resistance continuously varying along the surface from one edge to the other. In use, it will be apparent that the surface region lower in hardness wears faster than the region of higher hardness and hence the oil scraping edge of the surface, which is highest in hardness, can be kept acute enough to serve the intended purpose for a long period of time.

BRIEF DESCRIPTION OF THE DRAWING

The present invention will be described in more detail hereinafter with reference to the accompanying drawing, which illustrates one preferred embodiment of the present invention as applied to a rotary piston engine and in which:

FIG. 1 is a cross-sectional view showing oil seal rings fitted in the rotor or rotary piston of the engine and embodying the present invention;

FIG. 2 is a side elevational view, partly in cross section, of one of the oil seal rings shown in FIG. 1;

FIG. 3 is a fragmentary schematic cross-sectional view of the oil seal ring, illustrating the process of manufacturing the same;

FIG. 4 is a fragmentary cross-sectional view illustrating the manner in which the oil seal ring wears in use; and FIG. 5 is an explanatory diagram illustrating the distribution of contact pressure on the sliding surface of the ring shown in FIG. 4.

DESCRIPTION OF THE PREFERRED EMBODIMENT

Referring to the drawing and first to FIG. 1, reference numeral 1 indicates the side housing of a rotary piston combustion engine; 2 indicates a rotor housed eccentrically in the housing 1 for rotation therein; and 3 and 3a indicate grooves formed in one side of the rotor 2 to receive respective oil seal rings 4 and 4a embodying the present invention. The oil seal rings 4, 4a are used in combination with respective elastic sealing rings 5 and 5a of rubbery material and are each formed with a sealing edge 9 which is held in pressure contact with the inside wall surface 8 of the side housing 1 under the bias of a back spring 7. As will readily be understood, these oil seal rings in operation function to prevent the lubricating oil supplied to the space between the side housing 1 and rotor 2 from leaking in the combustion chamber outside thereof in any excessive amount.

Referring next to FIG. 2, in which one of the oil seal rings 4, is shown in cross section, the sliding surface of the oil seal ring 4, that is, the annular end surface 10 thereof engageable with the inside wall of the side housing, is formed at an angle of inclination $\alpha$ and has a hardness gradient, exhibiting a varying surface hardness which is highest at edge 9 and gradually decreases with the distance therefrom. The back or opposite end surface 11 of the oil seal ring as inserted in the groove 3 is in pressure engagement with the biasing spring 7. Also, the oil seal ring 4 is formed along the inner periphery thereof with an annular groove 12 to receive the elastic sealing ring 5.

Description will next be made of the procedure of imparting an appropriate hardness gradient to the sliding surface 10 of the oil seal ring 4 which faces the inside wall surface 8 of the side housing 1.

First, a ring blank is prepared which includes an appropriate shape and amount of material to be removed, having an end surface tapered or inclined oppositely relative to the sliding surface desired, 10, as shown in FIG. 3 by the dotted line 10a. The end surface 10a of the ring blank is first casehardened to an appropriate depth 14 by an ordinary nitriding process and is subsequently finished by appropriate machining means to obtain the sliding surface 10, which is tapered or inclined oppositely relative to the initial end surface 10a. The nitride casehardened surface layer 15 formed on the blank obviously exhibits a hardness varying with the depth and is the hardest at the outer surface so that, when finished as described above, various portions of the layer of different depths are exposed to form the sliding surface 10, imparting thereto a definite hardness gradient. In this manner, the finished surface 10 exhibits a varying hardness which is highest at the radially inner edge of the surface forming the ring edge 9 and gradually decreases with the distance therefrom in the upward direction as viewed in FIGS. 2 and 3.

It is to be noted that the hardness gradient of the sliding surface 10 can be readily selected by varying the angle of inclination, $\beta$, of the end surface 10a of the ring blank before nitriding. For example, to make the gradient steeper, it is required only to increase the angle $\beta$.

In use of the oil seal ring formed by the method of the present invention, it will readily be appreciated that the sliding surface 10 of the ring wears only at a minimized rate on account of the high wear resistance of the surface layer 15, giving such ring an extremely extended service life. In addition, the sliding surface 10 has a definite hardness gradient as described above, exhibiting a hardness which is maximized at the oil scraping edge 9 where wear resistance is most required and gradually decreases in the radially outward direction with the distance from therefrom. This obviously gives to the surface a tendency to wear in a pattern corresponding to the hardness gradient and at a rate varying with the distance from the oil scraping edge 9, enabling such edge to be kept acute despite of the surface wear inevitable in service.

FIG. 4 illustrates the manner in which the sliding surface 10 of oil seal ring 4 undergoes frictional wear, the nitride case or layer 15 being shown in a state partly worn and contacting with the inside wall surface 8 of the side housing 1 over a radial range 9a–9b. As will readily be noted, the worn ring surface in the range 9a–9b also exhibits a definite hardness gradient and a corresponding gradient in wear resistance and in pressure of contact with the wall surface 8. As observed in FIG. 5, illustrating the distribution of pressure of contact in the range 9a–9b, the pressure of contact of the nitride surface with the housing wall surface 8 is highest at the radially inner edge 9a of the surface, which serves the oil scraping purpose, and decreases with the distance therefrom.

While one embodiment of the present invention as applied to a rotary piston engine has been shown and described herein, it should be understood that the principles of the invention can also be applied with success to oil seal rings for a reciprocating type internal combustion engine, which are commonly called taper rings, including miniature taper rings, and used on the reciprocating pistons to serve the oil scraping and sealing purposes. The foregoing description applies in general to such oil seal rings as well, just regarding the housing wall surface 8 as the inside wall surface of one of the cylinders of the reciprocating type internal combustion engine.

It will also be noted that, though the nitriding process has been employed as case-hardening means in the above-described embodiment, other case-hardening methods including carburizing may also be employed instead with satisfactory results.

To summarize, the present invention provides an oil seal ring formed with a sliding surface having a definite hardness gradient and such oil seal ring can be made according to the method of the invention with extreme ease from a ring blank prepared with an appropriate amount of material to be machine cut or ground off and having an end surface tapered, as indicated in FIG. 3 at 10a, in a direction opposite to that in which the sliding surface 10 finally obtainable is tapered, simply by subjecting the blank surface to a casehardening process for penetration or diffusion therein of such hardening element as nitrogen, carbon or chromium and subsequently finishing the casehardened blank surface to the taper specified by machine cutting and grinding. The oil seal ring made in this manner exhibits a hardness varying radially along the finished sliding surface and, in use, is engageable with the associated engine wall surface at its edge where the hardness and hence wear resistance are highest. Thus, the ring edge 9 or 9a serving as an oil scraping edge can be held in sliding contact with the engine wall surface at all times under the highest pressure and at an acute angle to the wall surface. This means that the oil seal ring of the present invention can maintain a good oil scraping performance over the whole period of its use and has an extremely extended service life.

What is claimed is:

1. An oil seal ring for an internal combustion engine, characterized in that it has an oil scraping edge formed by one end of a casehardened inclined sliding surface exhibiting a variable depth hardness maximized at its oil scraping edge and gradually decreasing in depth with the radial distance therefrom to provide good oil scraping performance over an extended service life.

2. An oil seal ring for an internal combustion engine, as in claim 1, where the inclined sliding surface engages an associated engine wall surface at its edge, said edge being at a radially inner margin of the oil seal ring.

3. An oil seal ring for an internal combustion engine, as in claim 1, where the inclined sliding surface is provided on a hardened surface of the ring and where the depth of the hardening is maximized at its oil scraping edge and gradually decreases with the distance therefrom.

* * * * *